(12) United States Patent
Klutz

(10) Patent No.: US 8,485,345 B2
(45) Date of Patent: Jul. 16, 2013

(54) DEVICE FOR SCATTERING BULK MATERIAL

(75) Inventor: Hans-Joachim Klutz, Erftstadt (DE)

(73) Assignee: RWE Power Aktiengesellschaft, Essen (DE)

( * ) Notice: Subject to any disclaimer, the term of this patent is extended or adjusted under 35 U.S.C. 154(b) by 50 days.

(21) Appl. No.: 13/130,633

(22) PCT Filed: Nov. 24, 2008

(86) PCT No.: PCT/EP2008/009924
§ 371 (c)(1),
(2), (4) Date: Aug. 10, 2011

(87) PCT Pub. No.: WO2010/057511
PCT Pub. Date: May 27, 2010

(65) Prior Publication Data
US 2012/0125733 A1 May 24, 2012

(51) Int. Cl.
B65G 11/12 (2006.01)

(52) U.S. Cl.
USPC ........................................... 198/535; 198/536

(58) Field of Classification Search
USPC .............. 198/526, 528, 535, 536, 631.1, 952, 198/959; 193/2 R, 4, 10, 21, 24, 25 A
See application file for complete search history.

(56) References Cited

U.S. PATENT DOCUMENTS

| 3,682,394 A | 8/1972 | Shivvers |
| 3,773,165 A | 11/1973 | Tolles |
| 3,791,592 A | 2/1974 | Cobb |
| 3,989,194 A | 11/1976 | Parker |
| 4,094,399 A * | 6/1978 | George .......................... 198/535 |

(Continued)

FOREIGN PATENT DOCUMENTS

| FR | 2595338 | 9/1987 |
| RU | 2220085 | 12/2003 |
| SU | 1532482 | 12/1989 |
| WO | 2005/097635 | 10/2005 |

OTHER PUBLICATIONS

PCT International Search Report dated Jul. 30, 2009 received in corresponding PCT Application No. PCT/EP2008/009924.

(Continued)

Primary Examiner — Douglas Hess
(74) Attorney, Agent, or Firm — Grossman Tucker Perreault & Pfleger, PLLC

(57) ABSTRACT

The invention relates to an apparatus for scattering poured goods, comprising a distributor chute (1) having a feed area (12) and having an ejection area, wherein the distributor chute (1) can be rotated about a center axis, which runs vertically in the installed position in the gravity direction of the poured goods and is mounted inclined at an angle with respect to this center axis, wherein the distributor chute (1) has a first guiding longitudinal face, which forms the front face in the rotation direction, and a second longitudinal face, which trails with respect to the rotation direction, and wherein at least the second longitudinal face forms the ejection face of the distributor chute (1). The ejection face forms an ejection edge (7), which is curved in an S-shape. The distributor chute (1) can be moved transversely with respect to the vertical center axis, such that the feed point can be shifted in the feed area (12) such that the brown coal particles of the material flow which slides over the distributor chute (1) can be influenced in a targeted manner.

9 Claims, 3 Drawing Sheets

U.S. PATENT DOCUMENTS

| | | | |
|---|---|---|---|
| 4,216,914 A | | 8/1980 | O'Hanlon |
| 4,842,124 A | * | 6/1989 | Musschoot .................. 198/360 |
| 4,846,676 A | * | 7/1989 | Mathis ........................... 432/77 |
| 4,871,403 A | * | 10/1989 | Ludkovsky .................. 148/121 |
| 4,921,086 A | * | 5/1990 | Klutz et al. ....................... 193/3 |
| 4,940,005 A | | 7/1990 | Solvi |
| 5,273,148 A | * | 12/1993 | Lonardi et al. .................... 193/3 |
| 5,353,911 A | * | 10/1994 | Akers et al. .................. 198/360 |
| 5,450,936 A | * | 9/1995 | Andonov et al. ................. 193/3 |
| 6,390,268 B1 | * | 5/2002 | Lonardi ......................... 193/16 |
| 6,916,146 B1 | * | 7/2005 | Lonardi et al. ............... 414/293 |
| 7,311,486 B2 | | 12/2007 | Gorza |
| 2005/0217976 A1 | | 10/2005 | Hall |

OTHER PUBLICATIONS

PCT Written Opinion dated Jul. 30, 2009 received in corresponding PCT Application No. PCT/EP2008/009924.

English language translation of the International Preliminary Report on Patentability dated Jun. 30, 2011, received in corresponding PCT Application No. PCT/EP2008/009924.

Chinese Search Report dated Oct. 18, 2012, received in Chinese Application No. 200880132063.5, 1 page.

\* cited by examiner

DEVICE FOR SCATTERING BULK MATERIAL

The invention relates to an apparatus for scattering poured goods, comprising a distributor chute having a feed area and having an ejection area, wherein the distributor chute can be rotated about a center axis, which runs vertically in the installed position in the gravity direction of the poured goods and is mounted inclined at an angle with respect to this center axis, wherein the distributor chute has a first guiding longitudinal face, which forms the front face in the rotation direction, and a second longitudinal face, which trails with respect to the rotation direction, and wherein at least the second longitudinal face forms the ejection face of the distributor chute.

By way of example, an apparatus such as this is known from EP 0 343 466 B1. EP 0 343 466 B1 describes an apparatus for uniform distribution of material on a circular surface with the aid of an inclined rotating chute whose inclination angle is adjustable. The apparatus is used to distribute poured and sludge materials in the form of dust, grains, powders or in some other form, which are passed in successive uniform layers to a generally cylindrical area. Since applications such as these relate to the materials being distributed uniformly in the circle, EP 0 343 466 B1 proposes a special geometry for the distributor chute of the apparatus. The distributor chute has a long smooth sliding surface with a first longitudinal face, in the linear form, which forms the front face of the chute with respect to the rotation direction and is provided with a restraint edge, while the opposite second longitudinal face forms the ejection face. The longitudinal face which forms the ejection face is approximately S-shaped. This configuration takes account of the fact that the amount of material ejected at the end of the chute must be greater than the amount which falls into the center from the upper part of the chute, since the linear velocity of the chute increases from the center point to the periphery so that the area which is covered by the chute per unit time increases in proportion to the square of the radius.

The chute geometry described in EP 0 343 466 B1 is advantageous with respect to the poured goods being distributed scattered as uniformly as possible.

However, the apparatus has the disadvantage that the chute geometry, to achieve an optimum scattering behavior and distribution behavior cannot be calculated in advance since, depending on the field of use, a wide range of influencing factors, material characteristics and interactions between material and the chute surface cannot be described sufficiently accurately in a mathematical form.

Particularly when introducing raw lignite into a fluidized bed drier, it is desirable for the raw coal to be distributed as uniformly as possible on the fluidized bed surface. In order to obtain a fluidized bed with as little disturbance as possible, a constant specific area load on the fluidized bed surface by the material introduced is desirable, that is to say that, as far as possible, the same amount of coal should statistically be ejected on each area element of the ejection circle area. Particularly for the handling of raw lignite which, in the moist state from a mine, may have a proportion of water of up to 65%, the interactions between the material and the chute surface are difficult to define.

The optimum chute geometry as desired for the purposes of EP 0 343 466 B1 has therefore had to be determined experimentally for each application on a 1:1 scale with respect to the respective application. Such experimental investigations are, however, complex and costly, as a result of which they generally cannot be carried out.

The inclination and rotation speed of the distributor chute described in EP 0 34 466 B1 are variable although, from experience, this is not sufficient to optimize the distribution behavior during operation.

The invention is therefore based on the object of improving an apparatus of the type mentioned initially so as to make it possible to achieve a poured goods distribution which is as uniform as possible even with changing operating conditions and/or with changing material characteristics.

The object on which the invention is based is achieved by an apparatus for scattering poured goods, comprising a distributor chute having a feed area and having an ejection area, wherein the distributor chute can be rotated about a center axis, which runs vertically in the installed position in the gravity direction of the poured goods and is mounted inclined at an angle with respect to this center axis, wherein the distributor chute has a first guiding longitudinal face, which forms the front face in the rotation direction, and a second longitudinal face, which trails with respect to the rotation direction, and wherein at least the second longitudinal face forms the ejection face of the distributor chute. The apparatus according to the invention is distinguished in that the distributor chute can be moved transversely with respect to the vertical center axis. Such mounting of the distributor chute such that it can be moved transversely makes it possible to move the feed point in the feed area of the distributor chute. The material flow which occurs from a feed chute onto the distributor chute may strike the feed area at a greater or lesser extent away from the center longitudinal axis of the distributor chute, depending on the setting of the distributor chute, as a result of which the distance between the material flow and the ejection face may be of greater or lesser magnitude. This makes it possible to deliberately influence the particle path curve of the coal flow sliding over the chute.

It is particularly advantageous for the distributor chute to be mounted such that it can pivot about its longitudinal axis. For example, it is advantageous for the lateral inclination of the distributor chute to be adjustable.

The material flow can be influenced particularly well by a combination of the adjustable movement of the feed point of the material to be distributed and the adjustable inclination of the distributor chute in the direction of the ejection edge.

The inclination angle of the distributor chute is expediently adjustable with respect to a horizontal scattering circle plane. Furthermore, it is worthwhile designing the apparatus such that the rotation rate of the distributor chute is variable.

In order to achieve a wider adjustment range for the chute in the sense of a large or small scattering circle radius, it is advantageous for the feed area of the distributor chute to be curved in the longitudinal direction. It is thus possible to operate the chute with a reduced inclination, in which case a large distributor area can be covered with a constant chute length. The curvature of the chute in the feed area results in less deceleration of the material flow there than in the ejection area, without there being any need to vary the pitch angle of the distributor chute with respect to a horizontal.

It is particularly advantageous for the distributor chute to be heated. This makes it possible to avoid material becoming baked onto the chute surface. This likewise contributes to an optimized distribution behavior, with disturbances in the particle path curve of the material resulting from moisture-dependent baked-on areas being avoided.

It is particularly advantageous for the distributor chute to be in the form of a hollow profile, at least in the area of its sliding surface. The distributor chute can be connected to a steam supply for heating purposes.

In one particularly advantageous refinement of the apparatus according to the invention, at least one steam connection is provided to a distributor which is in the form of a rotary joint, and is arranged on the vertical center axis of the apparatus, in the installed position. The distributor can be arranged such that it is rotationally fixed with respect to the distributor chute, and can rotate with the distributor chute with respect to a steam supply line, which is laid in a fixed position.

The distributor chute furthermore expediently has a condensate outlet, which is likewise connected to the distributor.

This allows the distributor chute to be heated using low-pressure steam from a steam generation process. This is particularly advantageous when the apparatus according to the invention is used to introduce lignite into a fluidized bed drier in a method for steam generation from lignite. In the case of methods such as these, the initial drying of the lignite in a fluidized bed drier has been found to be advantageous from the energy point of view.

The invention will be explained in the following text, with reference to one exemplary embodiment, which is illustrated in the drawing, in which.

Figure 1:
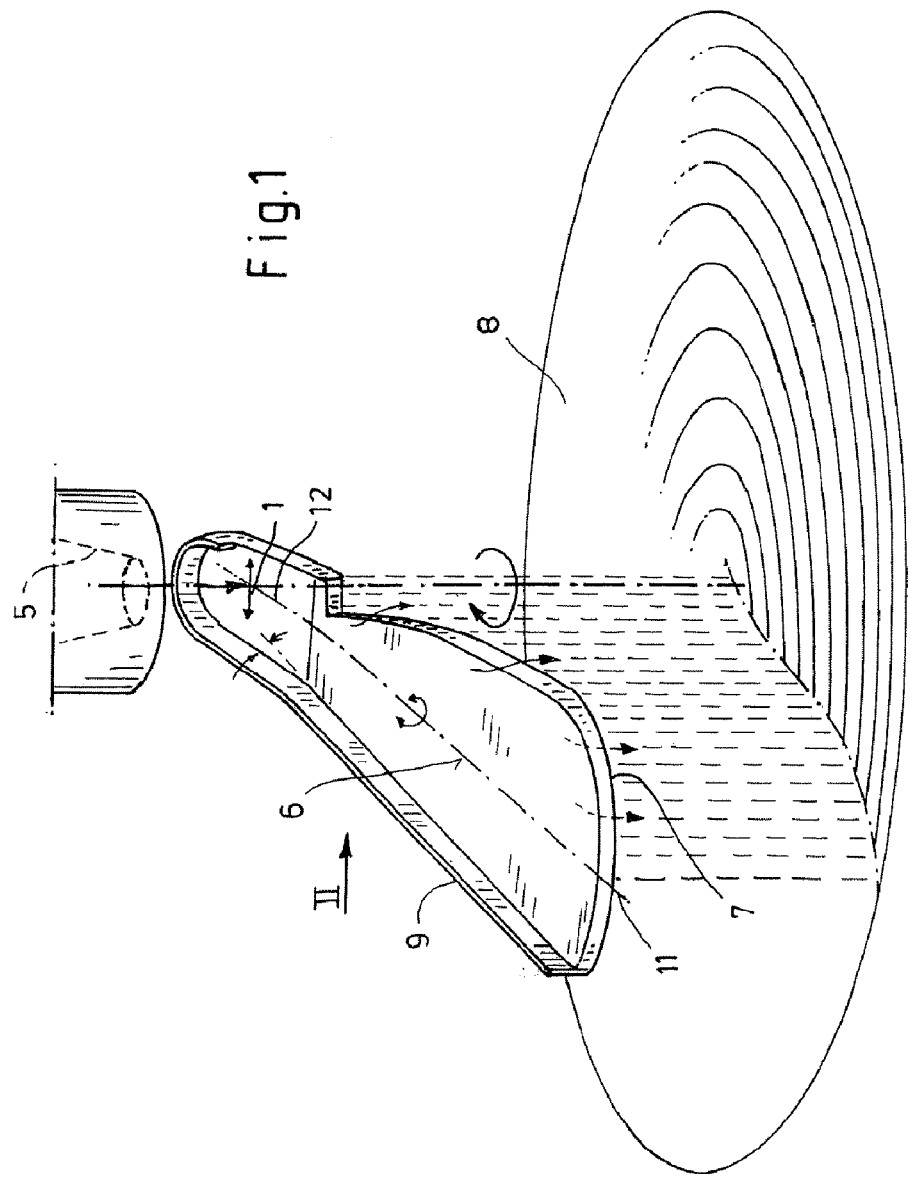
FIG. 1 shows a highly simplified perspective view of the apparatus according to the invention.
Figure 2:
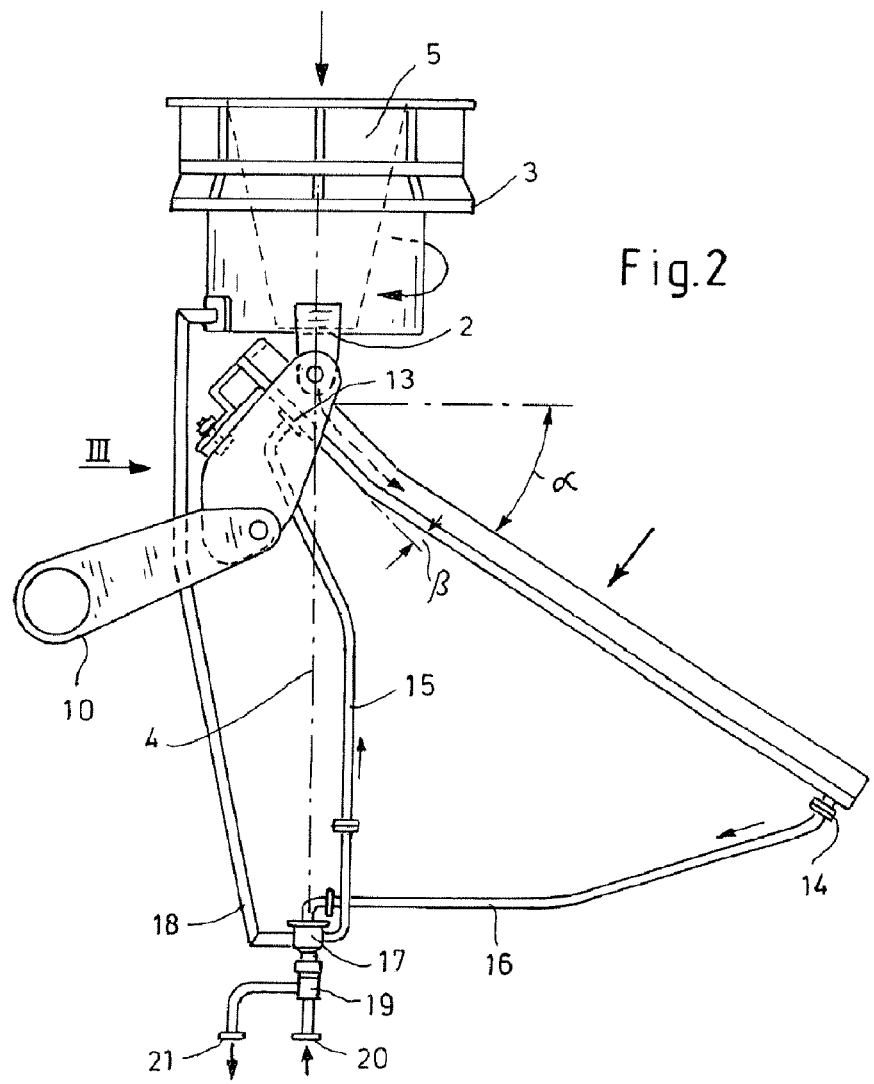
FIG. 2 shows a schematic side view of the apparatus according to the invention.
Figure 3:
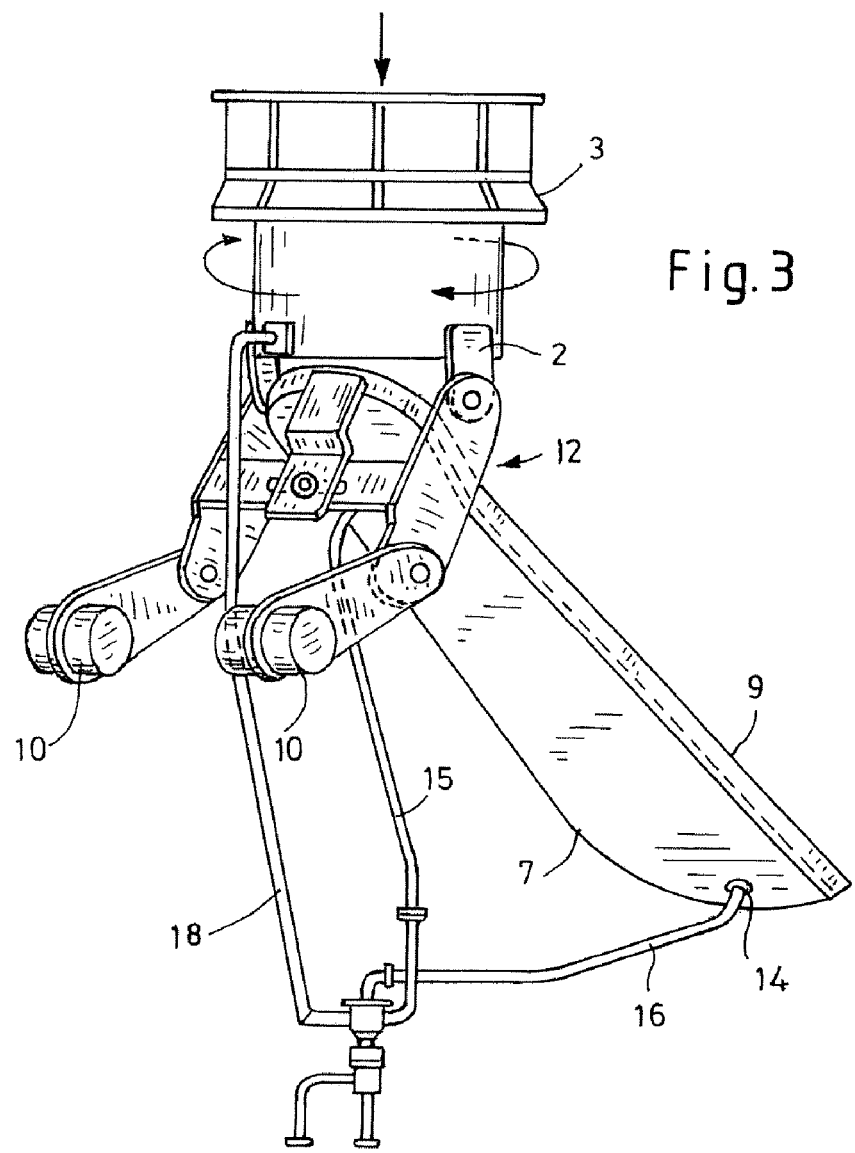
FIG. 3 shows a view from the direction of the arrow III in FIG. 2.

First of all, the following text will refer to FIGS. 2 and 3. The apparatus according to the invention has a distributor chute, which is annotated 1 and is rigidly connected via a holding bracket 2 to a ring mount 3. The ring mount is provided with drive means, which are not illustrated, via which it is caused to rotate uniformly about a vertical axis 4, with the distributor chute 1 attached to it. The ring mount 3 can for this purpose be provided with a circumferential tooth system, which is not illustrated which interacts with a drive pinion of an electric motor. The rotation sense of the arrangement is illustrated by the arrows shown in FIGS. 1 to 3. In the illustrated exemplary embodiment, the distributor chute 1 rotates clockwise.

Within the ring mount 3 and above the distributor chute 1, a feed chute 5 is arranged centrally, via which material which can be poured, for example moist raw lignite, is passed to the distributor chute 1.

The center longitudinal axis of the feed chute 5 is coincident with the vertical rotation axis 4 of the distributor chute 1.

Overall, the distributor chute 1 is inclined through the angle $\alpha$ with respect to a horizontal scattering circle plane. The inclination angle $\alpha$ of the distributor chute 1 is adjustable.

By way of example, lignite is passed via a bucket wheel sluice, which is not illustrated, via the feed chute 5 to the distributor chute 1 and slides under the influence of the force of gravity over the ejection edge 7, which is curved in an S-shape, with a rotary movement of the distributor chute 1 in the clockwise direction being superimposed on this movement of the poured goods caused by the force of gravity. The rotation rate of the distributor chute 1 is variable. This results in production of the scattering circle 8 as indicated in FIG. 1. The material is ejected uniformly in a circular shape over the scattering circle 8. On the side of the distributor chute 1 facing away from the ejection edge 7 what is trailing in the rotation direction of the distributor chute 1, the distributor chute 1 is provided with a restraint edge 9, which forms the leading longitudinal face of the distributor chute 1 in the rotational direction.

As already mentioned above, an inclination angle $\alpha$ can be set in a known manner in various steps with respect to a horizontal scattering circle plane of the distributor chute. In order to make it easier to adjust the inclination angle, the distributor chute 1 is provided with counterweights 10 on its side facing away from the chute surface 6. The balancing of the distributor chute 1 using counterweights furthermore advantageously reduces the load on the bearing of the distributor chute 1. 11 denotes the center longitudinal axis of the distributor chute. In the illustration of the distributor chute shown in FIG. 1, this is located in the neutral position with respect to the vertical rotation axis 4. The neutral position means that the vertical rotation axis 4 and the center longitudinal axis 11 of the distributor chute intersect such that the material flow occurs centrally in the feed area 12 of the distributor chute 1.

As is likewise indicated by arrows, the distributor chute 1 can be moved transversely from this neutral position, such that the feed point moves in the feed area 12 of the distributor chute 1 with respect to the center longitudinal axis 11 of the distributor chute 1. The feed point can be moved either closer to the restraint edge 9 or closer to the ejection edge 7.

Furthermore, the lateral inclination of the distributor chute 1 about the center longitudinal axis 11 is adjustable such that more material is ejected in the upstream area of the ejection edge 7 or more material is ejected in the downstream area of the ejection edge 7, depending on the lateral inclination. If the lateral inclination of the distributor chute 1 is set such that this gradient points in the direction of the ejection edge 7, more material is ejected in the upper, upstream area of the ejection edge 7. If the lateral inclination is in contrast set such that a gradient is created in the direction of the restraint edge, more material is ejected in the downstream area of the ejection edge 7.

In order to allow the radius of the scattering circle 8 to be varied over a relatively large adjustment range, the feed area 12 is curved in the direction of the center longitudinal axis 11 of the distributor chute 1 such that the inclination angle $\alpha$ with respect to a horizontal scattering circle plane is larger in the feed area 12 of the distributor chute by the amount of the angle $\beta$ shown in FIG. 2. This results in the material flow being decelerated to a lesser extent in the feed area 12, thus allowing the inclination angle $\alpha$ of the distributor chute 1 to be chosen to be smaller overall.

The feed area 12 of the distributor chute 1 need not necessarily be curved, and, in fact, the change in the inclination angle may also be discontinuous.

The distributor chute 1 has double walls at least in the area of the chute surface 6, and steam flows through it as a heating medium. A steam inlet 13 is provided in the feed area 12 on the side of the distributor chute facing away from the chute surface 6 and, in contrast, a condensate outlet 14 is provided at the end of the distributor chute 1 that is downstream in the flow direction. A steam supply line 15 is connected to the steam inlet 13, while in contrast a condensate collection line 16 is connected to the condensate outlet 14. The condensate collection line 16 and the steam supply line 15 are in turn connected to a distributor 17, which is firmly connected to the ring mount 3 via a holding arm 18.

On the other hand, the distributor 17 is connected such that it can rotate to a connecting piece 19 which is arranged such that it is stationary and which in turn opens into a steam line 20 and a condensate line 21. The distributor 17 and the connecting piece 19 which is connected to it such that it can rotate, and which are, of course, sealed with respect to one another, are arranged on the vertical rotation axis 4. The steam supply line 15 and the condensate collection line 16 as well as the distributor 17 can all carry out the rotary movement of the distributor chute 1 while, in contrast, the connecting piece 19, the steam line 20 and the condensate line 21 are arranged in a fixed position. This design makes it possible to heat the distributor chute 1 in a simple manner using low-pressure steam from the steam generation process.

LIST OF REFERENCE SYMBOLS

1 Distributor chute
2 Holding bracket
3 Ring mount
4 Vertical rotation axis
5 Feed chute
6 Chute surface
7 Ejection edge
8 Scattering circle
9 Restraint edge
10 Counterweights
11 Center longitudinal axis
12 Feed area
13 Steam inlet
14 Condensate outlet
15 Steam supply line
16 Condensate collection line
17 Distributor
18 Holding arm
19 Connecting piece
20 Steam line
21 Condensate line

The invention claimed is:

1. An apparatus for scattering poured goods, comprising a distributor chute having a feed area and having an ejection area, wherein the distributor chute can be rotated about a center axis, which runs vertically in an installed position in the gravity direction of the poured goods and is mounted inclined at an angle with respect to this center axis, wherein the distributor chute has a first guiding longitudinal face, which forms the front face in the rotation direction, and a second longitudinal face, which trails with respect to the rotation direction, and wherein at least the second longitudinal face forms the ejection face of the distributor chute, characterized in that the distributor chute can be moved transversely with respect to the vertical center axis;
   characterized in that the distributor chute is in the form of a hollow profile at least in the area of its sliding surface;
   characterized in that the distributor chute is connected to a steam supply for heating purposes; and
   characterized in that at least one steam connection is provided to a distributor which is in the form of a rotary joint and is arranged on the center axis of the apparatus.

2. The apparatus as claimed in claim 1, characterized in that the distributor chute is mounted such that the chute can pivot about the center axis.

3. The apparatus as claimed in claim 2, characterized in that the lateral inclination of the distributor chute is adjustable.

4. The apparatus as claimed in claim 1, characterized in that the inclination angle of the distributor chute can be adjusted with respect to a horizontal scattering circle plane.

5. The apparatus as claimed in claim 1, characterized in that the feed area of the distributor chute has a different inclination angle with respect to a horizontal scattering circle plane than the ejection area.

6. The apparatus as claimed in claim 5, characterized in that the feed area of the distributor chute is curved in the longitudinal direction of the distributor chute.

7. The apparatus as claimed in claim 1, characterized in that the distributor chute is heated.

8. The apparatus as claimed in claim 1, characterized in that the distributor is arranged such that it is rotationally fixed with respect to the distributor chute.

9. The apparatus as claimed in claim 1, characterized in that the distributor chute has a condensate outlet which is connected to the distributor.

* * * * *